(12) United States Patent
Bang (10) Patent No.: US 9,890,809 B2
(45) Date of Patent: Feb. 13, 2018

(54) TILTING PAD THRUST BEARING AND TILTING PAD THRUST BEARING ASSEMBLY

(71) Applicant: DOOSAN HEAVY INDUSTRIES & CONSTRUCTION CO., LTD., Changwon-si, Gyeongsangnam-do (KR)

(72) Inventor: Kyung Bo Bang, Changwon-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 0 days.

(21) Appl. No.: 14/978,534

(22) Filed: Dec. 22, 2015

(65) Prior Publication Data

US 2016/0186800 A1 Jun. 30, 2016

(30) Foreign Application Priority Data

Dec. 24, 2014 (KR) .................. 10-2014-0188792

(51) Int. Cl.
*F16C 17/24* (2006.01)
*F16C 33/10* (2006.01)
(Continued)

(52) U.S. Cl.
CPC .............. *F16C 17/24* (2013.01); *F16C 17/06* (2013.01); *F16C 27/02* (2013.01); *F16C 33/108* (2013.01);
(Continued)

(58) Field of Classification Search
CPC ........ F16C 17/06; F16C 17/24; F16C 17/243; F16C 27/02; F16C 33/1045; F16C 33/108;
(Continued)

(56) References Cited

U.S. PATENT DOCUMENTS 2,744,799 A * 5/1956 Howarth ................. F16C 17/06
384/308
3,814,487 A * 6/1974 Gardner .............. F16C 32/0692
384/307
(Continued)

FOREIGN PATENT DOCUMENTS

EP 0083987 A1 * 7/1983 .............. F16C 17/06
EP 2261522 A1 * 12/2010 .............. F16C 17/04
(Continued)

OTHER PUBLICATIONS

Korean Office Action of KR Application No. 10-2014-0188792 dated Dec. 1, 2015.
(Continued)

Primary Examiner — Marcus Charles
(74) Attorney, Agent, or Firm — Sughrue Mion, PLLC (57) ABSTRACT

A tilting pad thrust bearing and a tilting pad thrust bearing assembly are provided. The tilting pad thrust bearing is configured such that when a load is concentrated on only a portion of a thrust bearing because of eccentricity or inclination of a rotating shaft, associated tilting pads are tilted so that the load can be dispersed to the other tilting pads to which comparatively small load is applied, whereby the tilting pads to which the concentrated load is applied can be prevented from being damaged. Furthermore, the tilting pads can be fixed by oil supply nozzles without using a separate fastening member, whereby the size of the tilting pad thrust bearing can be markedly reduced. The tilting pads and a plate have improved structures so that the time and cost required to manufacture the tilting pad thrust bearing or tilting pad thrust bearing assembly can be reduced.

20 Claims, 11 Drawing Sheets

(51) Int. Cl.
*F16C 17/06* (2006.01)
*F16C 41/02* (2006.01)
*F16C 27/02* (2006.01)

(52) U.S. Cl.
CPC .......... *F16C 33/1045* (2013.01); *F16C 41/02* (2013.01); *F16C 17/243* (2013.01); *F16C 2360/00* (2013.01)

(58) Field of Classification Search
CPC ...... F16C 41/02; F16C 2360/00; F16C 25/02; F16C 33/10
USPC ....... 384/105, 122, 124, 224, 303, 307–309, 384/312, 368, 420, 626
See application file for complete search history.

(56) References Cited

U.S. PATENT DOCUMENTS

| | | | | |
|---|---|---|---|---|
| 4,335,925 A * | 6/1982 | Stopp | ...................... | F16C 17/06 384/125 |
| 4,738,550 A * | 4/1988 | Gardner | .................. | F16C 17/06 384/122 |
| 6,024,494 A * | 2/2000 | Buse | .................. | F04D 29/0413 384/122 |
| 6,183,138 B1 * | 2/2001 | New | ....................... | F16C 17/06 384/308 |
| 6,190,050 B1 * | 2/2001 | Campbell | ............... | F16C 17/04 29/898.041 |
| 6,443,621 B1 * | 9/2002 | New | ....................... | F16C 17/06 384/122 |
| 6,565,257 B1 * | 5/2003 | Kennedy | ............. | F04D 29/0413 384/122 |
| 8,408,802 B2 * | 4/2013 | Zeidan | .................... | F16C 17/06 384/122 |
| 8,439,567 B1 * | 5/2013 | Armentrout | ............ | F16C 17/04 384/122 |
| 8,545,103 B1 * | 10/2013 | Cooley | .................... | F16C 17/03 384/306 |
| 8,646,981 B2 * | 2/2014 | Peterson | ................. | F16C 17/06 384/306 |
| 2008/0131042 A1 * | 6/2008 | New | ....................... | F16C 17/06 384/224 |
| 2010/0215299 A1 | 8/2010 | Waki et al. | | |
| 2011/0174544 A1 * | 7/2011 | Scott | ....................... | E21B 4/003 175/92 |

FOREIGN PATENT DOCUMENTS

| | | | | |
|---|---|---|---|---|
| JP | 5114991 Y1 | | 4/1976 | |
| JP | 62-151430 U | | 9/1987 | |
| JP | 11062971 A | * | 3/1999 | .............. F16C 33/10 |
| JP | 2002-81438 A | | 3/2002 | |
| JP | 2003232339 A | * | 8/2003 | .............. F16C 17/04 |
| JP | 2012117608 A | | 6/2012 | |
| KR | 20030013507 A | * | 2/2003 | .............. F04D 29/04 |
| KR | 100748595 B1 | * | 8/2007 | .............. F16C 17/06 |
| KR | 10-2011-0095424 A | | 8/2011 | |

OTHER PUBLICATIONS

Communication dated Jan. 10, 2017, from the Japanese Patent Office in counterpart application No. 2015-247776.

* cited by examiner

TILTING PAD THRUST BEARING AND TILTING PAD THRUST BEARING ASSEMBLY

CROSS-REFERENCE TO RELATED APPLICATION(S)

This application claims priority to Korean Patent Application No. 10-2014-0188792, filed on Dec. 24, 2014, the disclosure of which is incorporated herein by reference in its entirety.

BACKGROUND

Field

Exemplary embodiments of the present disclosure relate to a tilting pad thrust bearing and a tilting pad thrust bearing assembly, and more particularly, to a tilting pad thrust bearing which is configured such that a load concentrated on a portion of the thrust bearing by eccentricity or inclination of a rotating shaft such as a rotor can be dispersed, and a tilting pad thrust bearing assembly having the tilting pad thrust bearing.

Description of the Related Art

Generally, a bearing is a device which rotatably supports a rotating shaft or a reciprocating shaft. Bearings are classified into sliding bearings and roller bearings according to a method in which a shaft makes contact with a bearing. Furthermore, according to a direction in which a load is applied to the shaft, bearings are classified into radial bearings and thrust bearings. Thrust bearings are used to support axial thrust force of a rotating shaft such as a turbine rotor or the like which rotates at high speed.

Typically, turbines convert thermal energy of combustion gas or steam supplied from a boiler into rotational force of a turbine rotor and drives a generator using the rotational force of the rotor, thus producing electricity. The axial thrust force of the turbine rotor is supported by thrust bearings.

Nowadays, increasingly, equipment such as turbine rotors is designed such that a rotating shaft thereof can be rotated at high speed to increase the efficiency of the equipment with a reduced weight.

Thus, the rotating shaft may be inclined by vibration or its own weight. If the rotating shaft is inclined, a concentrated load is applied to a portion of the thrust bearing which supports the rotating shaft.

As such, if a concentrated load is applied to a portion of the thrust bearing by inclination of the rotating shaft, the thrust bearing having pads is problematic in that a temperature difference between upper pads and lower pads is caused, whereby vibration intensifies because of thermal deformation.

Furthermore, in the conventional thrust bearing, a pad or tilting pad may be damaged by a concentrated load. In this case, replacement of the thrust bearing is required, thus increasing maintenance costs. Moreover, the operation of equipment such as a turbine must be interrupted to replace the thrust bearing with another one, so that the productivity is reduced.

In addition, the conventional tilting pad thrust bearing is problematic in that due to a complex structure, the production cost and time are increased, and the thickness of the bearing is excessively increased.

PATENT DOCUMENT (Patent Document 1) Korean Utility Model Registration No. 20-0368652

SUMMARY

An object is to provide a tilting pad thrust bearing and a tilting pad thrust bearing assembly which are configured such that when a load is concentrated on only a portion of a thrust bearing because of eccentricity or inclination of a rotating shaft such as a rotor, associated tilting pads are tilted so that the load can be dispersed to the other tilting pads to which a comparatively small load is applied, whereby the tilting pads to which the concentrated load is applied can be prevented from being damaged.

Another object is to provide a tilting pad thrust bearing and a tilting pad thrust bearing assembly in which the tilting pads can be fixed by oil supply nozzles without using a separate fastening member, whereby the size of the tilting pad thrust bearing can be markedly reduced, and in which a tilting pad and a plate have improved structures so that the time and cost required to manufacture the tilting pad thrust bearing or the tilting pad thrust bearing assembly can be reduced.

Other objects and advantages of the present disclosure can be understood by the following description, and become apparent with reference to the exemplary embodiments. Also, it is obvious to those skilled in the art to which the present disclosure pertains that the objects and advantages can be realized by the means as claimed and combinations thereof.

In accordance with one aspect, a tilting pad thrust bearing includes: a casing having a disk shape and including a first side protrusion protruding along an outer circumferential edge of a first-side planar surface of the casing, with a first receiving part formed in the planar surface; a plate spring having a shape corresponding to a shape of the first receiving part, the plate spring being installed in the first receiving part; a plurality of oil supply nozzles inserted into the casing via the plate spring; and a plurality of tilting pads installed on a planar surface of the plate spring so as to be tiltable relative to the planar surface of the plate spring.

In the tilting pad thrust bearing in accordance with another aspect, shaft holes may be respectively formed in the casing and the plate spring so that a rotating shaft is disposed in the shaft holes, and the casing and the plate spring each may include two semicircular parts coupled to each other to form the disk shape.

In the tilting pad thrust bearing in accordance with another aspect, the first receiving part may include: a plurality of insert holes formed in a planar surface of the first receiving part and arranged in a circumferential direction of the first receiving part at positions spaced apart from each other, wherein the oil supply nozzles are inserted into the respective insert holes; and a plurality of coupling holes formed in the planar surface of the first receiving part and arranged in the circumferential direction of the first receiving part, wherein fastening means for coupling the plate spring to the first receiving part is inserted into the coupling holes.

In the tilting pad thrust bearing in accordance with another aspect, a peripheral depression may be formed in a circumferential direction in an outer circumferential surface of the casing. A plurality of oil supply holes and a plurality of oil passages may be formed in the peripheral depression and arranged in the circumferential direction, wherein the oil supply holes may communicate with the respective insert holes, and the oil passages may extend inward in a radial direction from the respective oil supply holes to the corresponding insert holes.

In the tilting pad thrust bearing in accordance with another aspect, the plate spring may include: a plurality of base parts coming into contact with the planar surface of the first receiving part; a plurality of seating parts protruding from the base parts toward the tilting pad; and a plurality of bridge parts connecting the base parts and the seating parts.

In the tilting pad thrust bearing in accordance with another aspect, the plate spring may include a plurality of fixing holes formed at positions corresponding to the respective coupling holes, the fixing holes extending from the bridge parts to the base parts, wherein the fastening means is inserted into the fixing holes.

In the tilting pad thrust bearing in accordance with another aspect, the plate spring may further include a plurality of through holes formed at positions corresponding to the respective insert holes, the through holes extending from the bridge parts to the base parts, wherein the fastening means is inserted into the through holes.

In the tilting pad thrust bearing in accordance with another aspect, the plate spring may further include a stop protrusion protruding from a radial-inner edge of each of the seating parts and restricting movement of the corresponding tilting pad.

In the tilting pad thrust bearing in accordance with another aspect, each of the oil supply nozzles may include: a cylindrical nozzle body inserted at a first end thereof into the corresponding insert hole; and a flange provided around an outer circumferential surface of a second end of the nozzle body.

In the tilting pad thrust bearing in accordance with another aspect, each of the oil supply nozzles may further include: an oil outlet port formed on the flange; and a hollow portion formed to pass through the nozzle body in a longitudinal direction of the nozzle body, the hollow portion communicating with the oil outlet port.

In the tilting pad thrust bearing in accordance with another aspect, the oil outlet port may protrude outward from a planar surface of the flange.

Each of the tilting pads may include: a pad body; and a groove formed in each of opposite side surfaces of the pad body so that a portion of the corresponding flange is inserted into the groove.

In the tilting pad thrust bearing in accordance with another aspect, the width of the groove of the tilting pad may be greater than the thickness of the flange.

In the tilting pad thrust bearing in accordance with another aspect, the casing may include: a second-side protrusion protruding along an outer circumferential edge of a planar surface facing away from the planar surface on which the first side protrusion is provided; and a second receiving part provided on the planar surface on which the second side protrusion is provided.

The tilting pad thrust bearing in accordance with another aspect may further include a shim plate installed in the second receiving part, the shim plate having a shape corresponding to the second receiving part.

In the tilting pad thrust bearing in accordance with another aspect, the shim plate may include two semicircular divided parts coupled to each other to have a disk shape.

In the tilting pad thrust bearing in accordance with another aspect, a plurality of pin holes may be formed in the shim plate so that pins are inserted into the respective pin holes.

The tilting pad thrust bearing in accordance with another aspect may further include a plurality of thermocouple guide units. Each of thermocouple guide units may include: a support installed in the first side protrusion; and a guide inserted through the support.

In the tilting pad thrust bearing in accordance with another aspect, each of the thermocouple guides may be configured such that a front end thereof protrudes from the first side protrusion.

In accordance with another aspect, a tilting pad thrust bearing assembly has the tilting pad thrust bearing according to any one of the aspects of the present invention. The tilting pad thrust bearing assembly includes a cylindrical housing having a hollow hole in a central portion thereof, wherein the tilting pad thrust bearing comprises a plurality of tilting pad thrust bearings installed to be symmetrical to each other in the housing such that the tilting pads of the tilting pad thrust bearings face each other.

It is to be understood that both the foregoing general description and the following detailed description are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Hereinafter, exemplary embodiments will be described in detail with reference to the attached drawings. Reference now should be made to the drawings, in which the same reference numerals are used throughout the different drawings to designate the same or similar components.

A tilting pad thrust bearing according to an exemplary embodiment of the present invention will be described with reference to FIGS. 1 to 9. As shown in FIGS. 1 to 9, the tilting pad thrust bearing 10 according to the embodiment includes a casing 100, a plate spring 200, oil supply nozzles 300, and tilting pads 400. Furthermore, the tilting pad thrust bearing according to the present embodiment further includes a shim plate 500 or/and thermocouple guide units 600.

In the present embodiment, the casing 100, the plate spring 200 and the shim plate 500 each may have a semicircular shape for the sake of assembly. That is, the casing 100 may be formed of upper and lower semicircular casings, the plate spring 200 may be formed of upper and lower semicircular plate springs, and the shim plate 500 may be formed of upper and lower semicircular shim plates. The overall configuration of each of the casing 100, the plate spring 200 and the shim plate 500 is the same between the case where it has a single body structure and the case where it has a structure divided into upper and lower parts. Therefore, in the following description, as shown in FIGS. 1 to 9, the embodiment will be explained based on the divided structure (for the sake of explanation, based on FIG. 1, a side at which the tiling pads are disposed is defined as a first side or direction, and a side at which the shim plate is disposed is defined as a second side or direction).

The casing 100 has a disk shape with a predetermined thickness. In the present embodiment, the casing 100 having a disk shape is formed by coupling two semicircular divided pieces to each other. The casing 100 has in a central portion thereof a shaft hole through which a rotating shaft is inserted into the casing 100 (hereinafter, a direction along an outer circumferential outer surface of the casing is defined as a circumferential direction, and a direction coming from a center of a circle having the circumferential surface of the casing as a circumference thereof is defined as a radial direction).

A first side protrusion 110 and a second side protrusion 120 extend along respective outer circumferential edges of planar surfaces of the casing 100 and protrude in directions facing away from each other. A first receiving part 140 and a second receiving part 150 are formed between the outer and inner circumferential surfaces of the casing 100 in directions facing away from each other. That is, the first side protrusion 110 and the first receiving part 140 are formed at the first side, and the second side protrusion 120 and the second receiving part 150 are formed at the second side. The plate spring 200 and the tilting pads 400 are received in the first receiving part 140, and the shim plate 500 is received in the second receiving part 150.

As shown in FIGS. 1 to 5, a plurality of insert holes 142 and a plurality of coupling holes 143 are formed in the first receiving part 140.

The insert holes 142 are formed to pass through a planar surface 141 of the first receiving part 140 at positions spaced apart from each other in the circumferential direction. The oil supply nozzles 300 are inserted into the respective insert holes 142.

Figure 4:
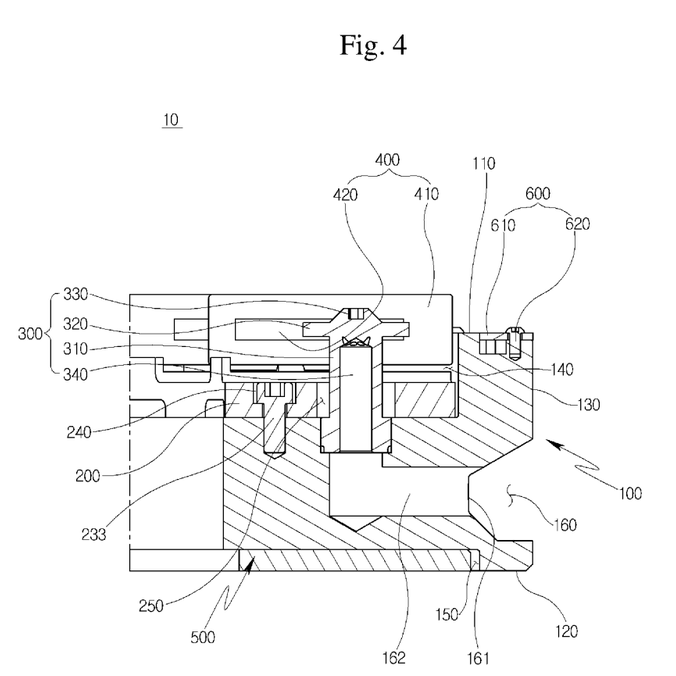
FIG. 4 is a sectional view taken along line 4-4 of FIG. 2.
Figure 5:
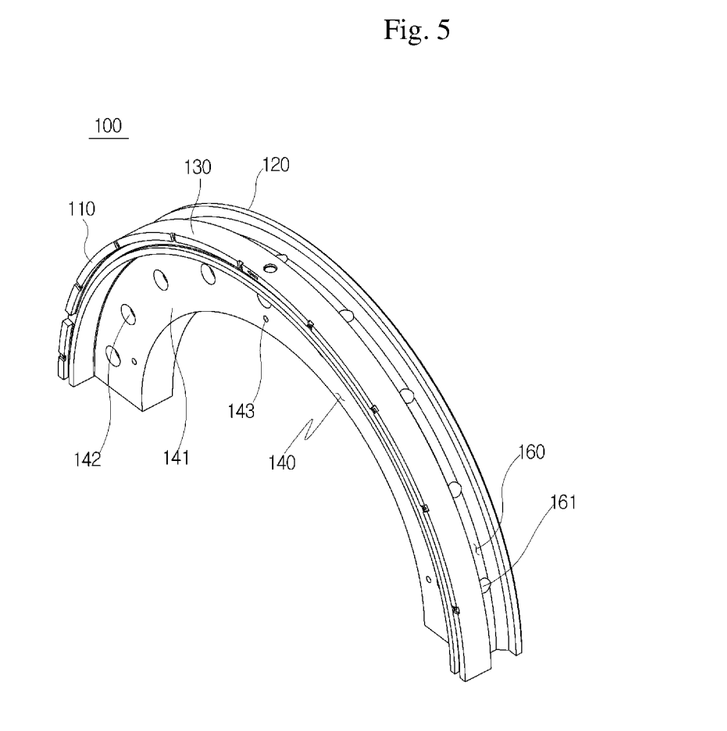
FIG. 5 is a perspective view illustrating a casing of the tilting pad thrust bearing according to the exemplary embodiment.
Figure 6:
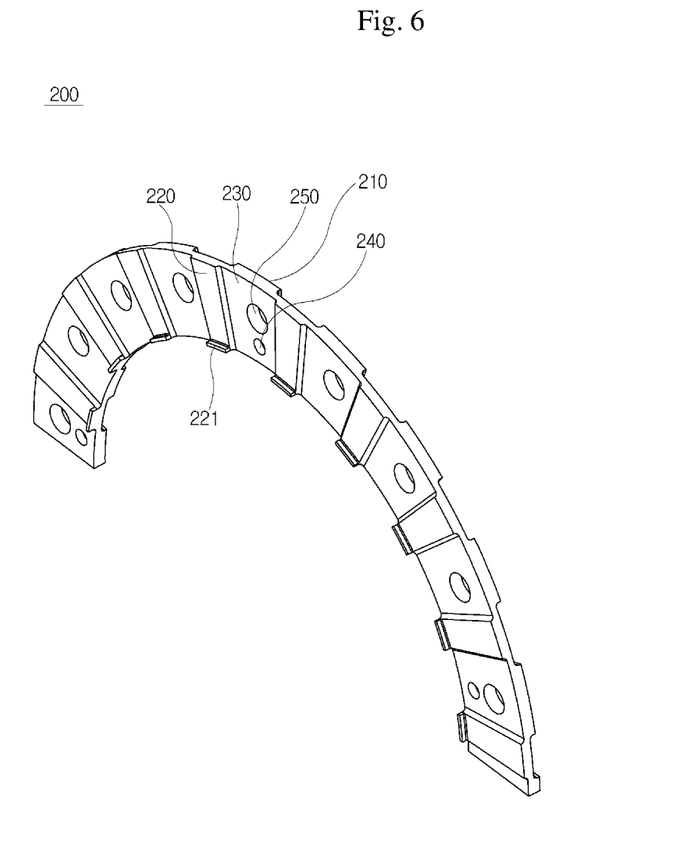
FIG. 6 is a perspective view illustrating a plate spring of the tilting pad thrust bearing according to the exemplary embodiment.

Furthermore, the coupling holes 143, which are used to fix the plate spring 200 to the first receiving part 140, are formed to pass through the planar surface 141 of the first receiving part 140 at positions spaced apart from each other in the circumferential direction. It is preferable that the coupling holes 143 be formed in the planar surface 141 at positions spaced apart from each other at appropriate intervals such that the coupling holes 143 do not overlap with the insert holes 142. Although not limited, two coupling holes 143 may be respectively formed at three and nine o'clock positions in the planar surface 141 of the first receiving part 140 having a semicircular shape. Alternatively, three coupling holes 143 may be respectively formed at three, nine, and twelve o'clock positions so as to more reliably fix the plate spring 200 to the first receiving part 140. As shown in FIGS. 4 and 6, a plurality of fixing holes 240 are formed in the plate spring 200. The plate spring 200 is coupled to the first receiving part 140 by a fastening means 233 inserted into each coupling hole 143 through the corresponding fixing hole 240. For example, the fastening means 233 may be a bolt.

As shown in FIGS. 1 to 5, a peripheral depression 160 is formed in the circumferential direction in the outer circumferential surface 130 of the casing 100. A plurality of oil supply holes 161 and a plurality of oil passages 162 are formed in the peripheral depression 160.

Preferably, the oil supply holes 161 communicate with the respective insert holes 142. For this, the oil passages 162 extend inward in the radial direction from the respective oil supply holes 161 to the corresponding insert holes 142.

Although not shown, an oil passage pipe extending from a separate oil supply device is connected to the oil supply holes 161 so that oil can be applied to contact surfaces of the tilting pads 400 through the oil supply holes 161 and the insert holes 142.

The plate spring 200 has a disk shape with a shaft hole and, in the present embodiment, it is formed by coupling two semicircular plates to each other. The plate spring 200 is installed in the first receiving part 140. When an eccentric load is applied to the tilting pads 400, the plate spring 200 functions to disperse the load applied to the tilting pads 400. That is, when the tilting pads 400 to which an eccentric load is applied compress the plate spring 200, the plate spring 200 transmits force from some of the tilting pads that receive a comparatively large force to the remaining tilting pads that receive a comparatively small force, thus dispersing the force, thereby making the load be uniformly applied to the tilting pads.

Figure 1:
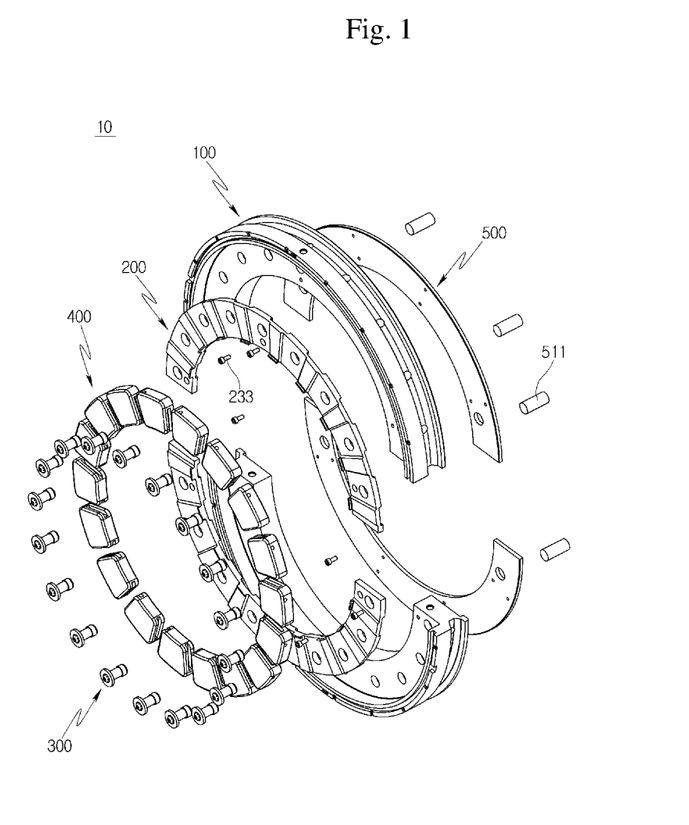
FIG. 1 is an exploded perspective view illustrating a tilting pad thrust bearing according to an exemplary embodiment.

As shown in FIGS. 1, 4 and 6, the plate spring 200 according to the embodiment includes a plurality of base parts 210, a plurality of seating parts 220, and a plurality of bridge parts 230.

The base parts 210 come into contact with the planar surface 141 of the first receiving part 140. The seating parts 220 protrude from the base parts 210 toward the tilting pad 400. The bridge parts 230 connect the base parts 210 and the seating parts 220 to each other. The base parts 210, the seating parts 220 and the bridge parts 230 of the plate spring 200 form a corrugated shape with respect to the circumferential direction of the first receiving part 140. In addition, the base parts 210, the seating parts 220 and the bridge parts 230 of the plate spring 200 may be integrally formed into a single body. As shown in FIG. 6, each bridge part 230 is formed on a first surface of the corresponding base part 210, and the seating parts 220 protruding toward the tilting pad 400 are formed on opposite sides of the bridge parts 230 along the circumferential direction. Although not limited, the base parts 210, the seating parts 220 and the bridge parts 230 each have a trapezoidal shape in which an outer-diameter side edge thereof is longer than an inner-diameter side edge facing the shaft hole.

As shown in FIGS. 1, 4 and 6, the plurality of fixing holes 240 and a plurality of through holes 250 are formed in the plate spring 200 according to the embodiment.

The fixing holes 240 correspond to the positions of the respective coupling holes 143 of the first receiving part 140. Each fixing hole 240 is formed to extend from the corresponding bridge part 230 to the associated base part 210. The plate spring 200 is fixed to the planar surface 141 of the first receiving part 140 by the fastening means 233 inserted into the coupling holes 143 through the fixing holes 240. In an embodiment, two fixing holes 240 may be respectively formed at three and nine o'clock positions corresponding to the coupling holes 143 formed in the planar surface 141 of the first receiving part 140 having a semicircular shape. Alternatively, three fixing holes 240 may be respectively formed at three, nine, and twelve o'clock positions corresponding to the respective coupling holes 143 so as to more reliably fix the plate spring 200 to the first receiving part 140.

The through holes 250 are formed at positions corresponding to the respective insert holes 142 formed in the planar surface 141 of the first receiving part 140 and extend from the respective bridge parts 230 to the corresponding base parts 210. The through holes 250 are formed at positions corresponding to the positions of the respective insert holes 142. The oil supply nozzles 300 are inserted into the respective insert holes 142 through the corresponding through holes 250.

The tilting pads 400 which are seated on the seating parts 220 at the first side may be pushed toward the shaft hole. To prevent this, as shown in FIG. 6, a stop protrusion 221 is provided on a shaft-hole side end of each seating part 220.

The oil supply nozzles 300 are inserted into the casing 100 via the plate spring 200.

Figure 7:
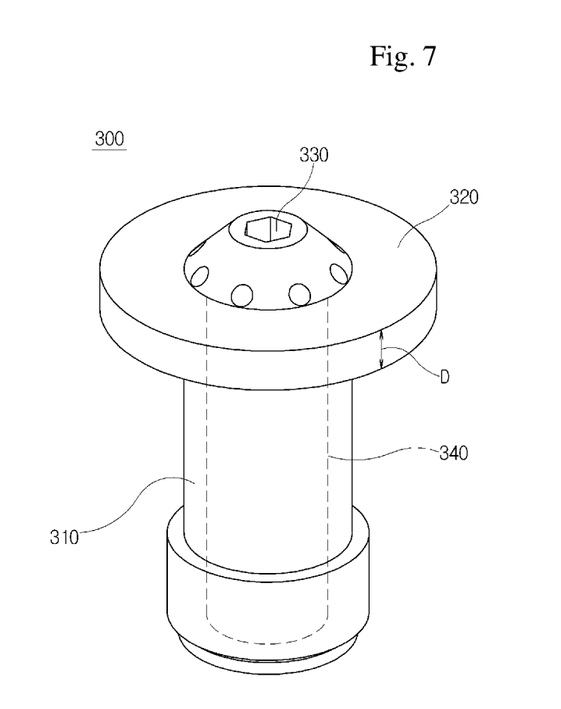
FIG. 7 is a perspective view illustrating an oil supply nozzle of the tilting pad thrust bearing according to the exemplary embodiment.

As shown in FIGS. 4 and 7, each oil supply nozzle 300 of the tilting pad thrust bearing 10 according to the embodiment includes a cylindrical nozzle body 310 and a disk-shaped flange 320 which is provided on an end of the nozzle body 310. Furthermore, each oil supply nozzle 300 of the tilting pad thrust bearing 10 according to the embodiment may further include an oil outlet port 330 and a hollow portion 340.

The nozzle body 310 has a cylindrical shape. A portion of a first end of the nozzle body 310 is inserted into the corresponding insert hole 142.

The flange 320 is provided on a second end of the nozzle body 310. In detail, the flange 320 is formed around an outer circumferential surface of the nozzle body 310. The flange 320 has a disk shape with a predetermined thickness (D). The oil outlet port 330 is formed to protrude from a planar surface of the flange 320. A portion of the flange 320 is disposed in a groove 420, which will be explained later herein.

The oil outlet port 330 protrudes outward from the flange 320 and communicates with the hollow portion 340. The oil outlet port 330 functions to supply oil to the corresponding tilting pad 400.

The hollow portion 340 is formed to pass through the nozzle body 310 in a longitudinal direction of the nozzle body 310. The hollow portion 340 forms a passage through which oil supplied from the oil passage 162 flows to the oil outlet port 330. In other words, oil supplied from the external oil supply device through the oil supply hole 161 passes through the oil passage 162 and then is discharged out of the oil outlet port 330 via the hollow portion 340 and thus supplied to the tilting pad 400.

The tilting pads 400 are disposed at the first side of the plate spring 200 and are installed so as to be tiltable with respect to an imaginary center axis passing through the shaft hole of the tilting pad thrust bearing 10. Although not limited, each tilting pad 400 has a trapezoidal shape in which an outer edge thereof with respect to the radial direction of the casing 100 is longer than an inner edge thereof.

Figure 8:
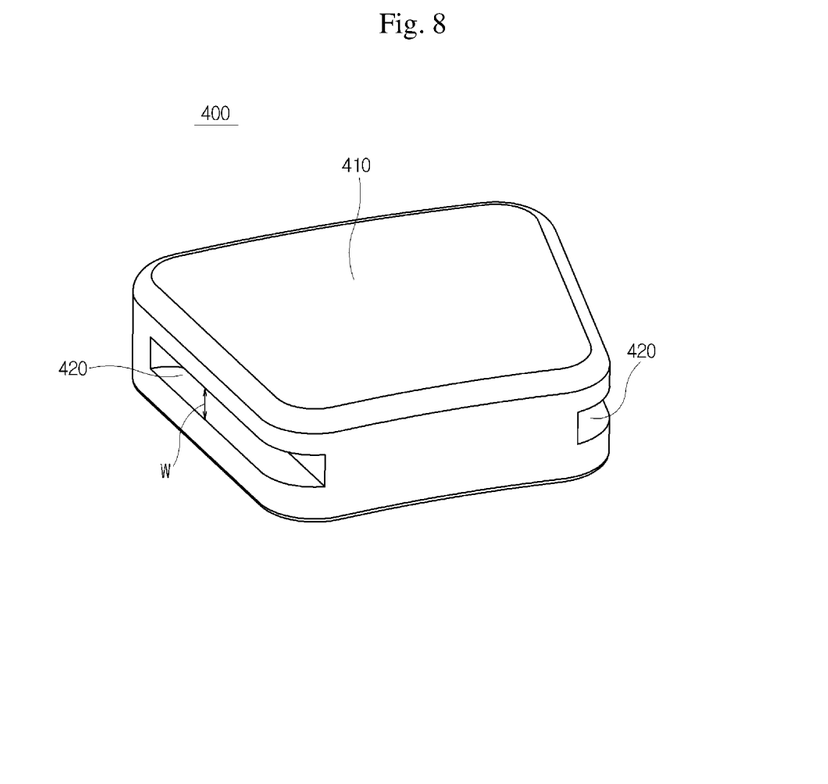
FIG. 8 is a perspective view illustrating a tilting pad of the tilting pad thrust bearing according to the exemplary embodiment.

As shown in FIGS. 4 and 8, each tilting pad 400 according to an embodiment of includes a pad body 410 and grooves 420.

The pad body 410 forms the appearance of the tilting pad 400.

The grooves 420 are formed in the radial direction in respective opposite side surfaces of the pad body 410. Each groove 420 receives therein a portion of the corresponding flange 320, as described above. As shown in FIG. 4, one side of the tilting pad 400 is fixed by inserting a portion of the flange 320 into the corresponding groove 420. The other side of the tilting pad 400 is fixed by inserting the flange 320 of another adjacent oil supply nozzle 300 into the groove 420 formed in the side surface of the pad body 410. In other words, each tilting pad 400 is fixed by the flanges 320 of the two oil supply nozzles 300 in such a way that portions of the flanges 320 are disposed in the respective grooves 420 of the tilting pad 400.

Therefore, the tilting pads can be fixed by the oil supply nozzles without using a separate fastening member. Thereby, the size of the tilting pad thrust bearing can be markedly reduced.

A width W of each groove 420 of the tilting pad 400 is greater than a thickness D of the flange 320. Thus, the tilting pads 400 are tiltable with respect to the imaginary center axis passing through the shaft hole of the tilting pad thrust bearing 10. Hence, when a load is applied to some of the tilting pads 400, the load can be dispersed to the other adjacent tilting pads to which no load is applied. In this way, the tilting pads can be prevented. Furthermore, the time and cost required to install the tilting pads 400 on the seating parts 220 can be reduced.

Figure 3:
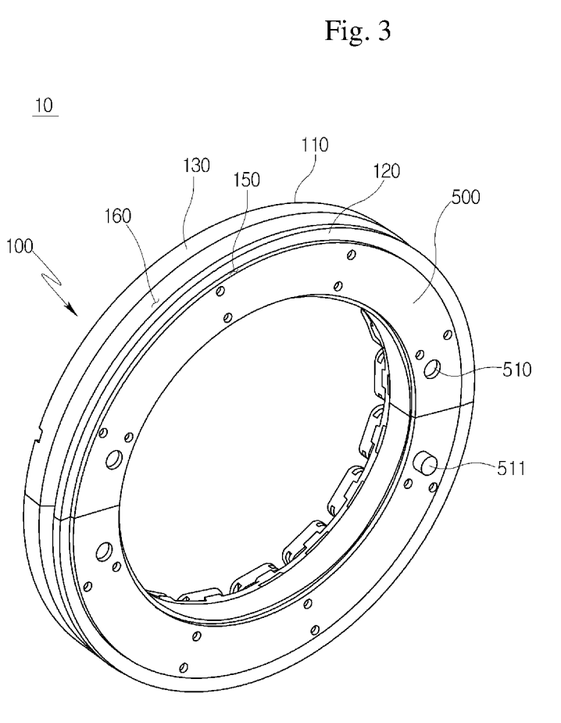
FIG. 3 is a rear perspective view illustrating the tilting pad thrust bearing according to the exemplary embodiment.
Figure 9:
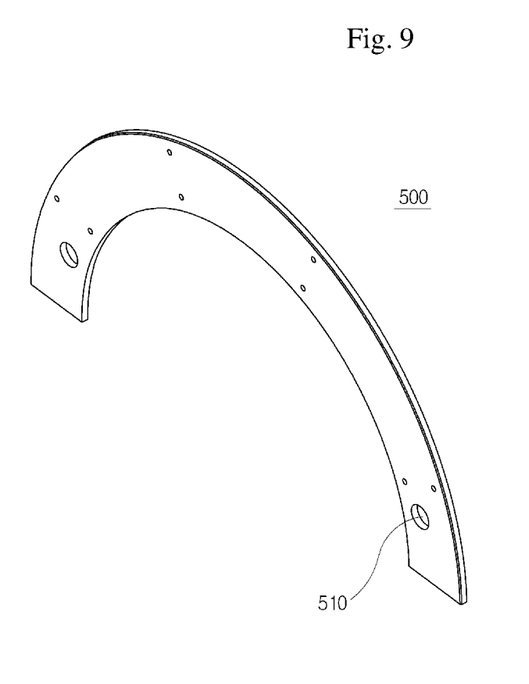
FIG. 9 is a perspective view illustrating a shim plate of the tilting pad thrust bearing according to the exemplary embodiment.

As shown in FIGS. 3 and 9, two semicircular shim plates 500 are installed in the second receiving part 150 of the casing 100.

Referring to FIGS. 3 and 9, a plurality of pin holes 510 are formed in the shim plate 500. Pins 511 are inserted into the respective pin holes 510. The tilting pad thrust bearing 10 can be mounted to a housing by the pins 511. Although not limited, two pin holes 510 may be respectively formed at three and nine o'clock positions in the shim plate 500 having a semicircular shape. In addition, as needed, additional shim plates 500 may be provided.

Figure 2:
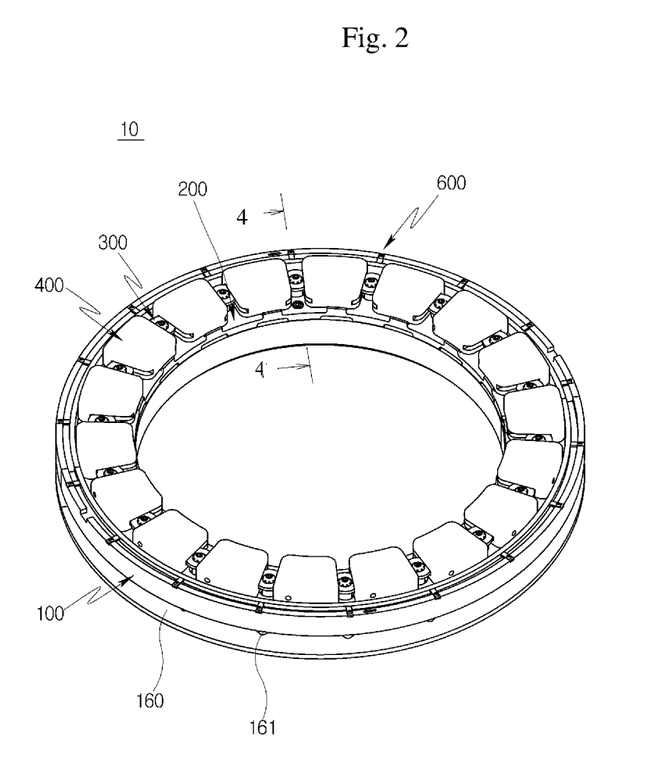
FIG. 2 is a front perspective view illustrating the tilting pad thrust bearing according to the exemplary embodiment.

As shown in FIGS. 2 and 4, the tilting pad thrust bearing 10 according to the embodiment may further include a plurality of thermocouple guide units 600.

Each thermocouple guide unit 600 includes a support 610 which is installed in the first side protrusion 110, and a guide 620 which is inserted through the support 610 such that a front end of the guide 620 protrudes from the surface of the first side protrusion 110. The thermocouple guide unit 600 functions to check the thrust bearing for defects.

Figure 10:
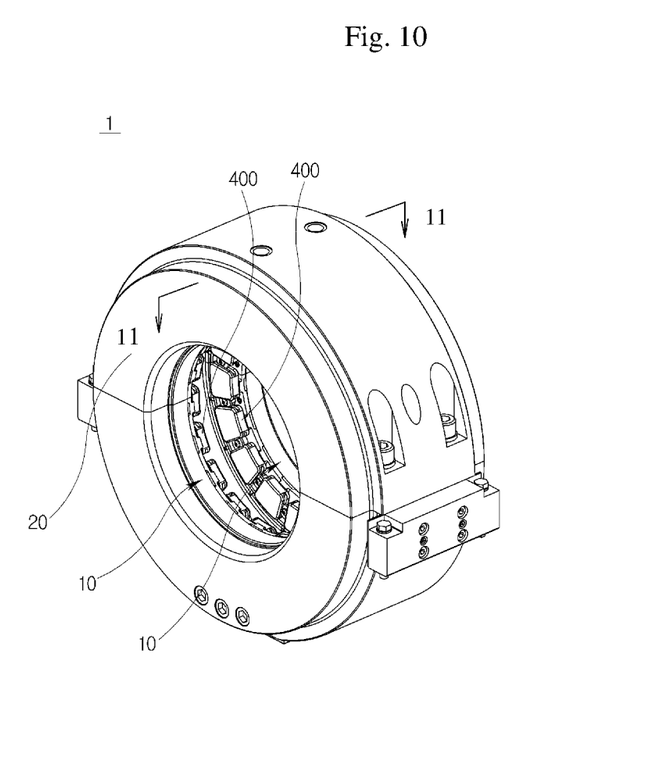
FIG. 10 is a perspective view illustrating a tilting pad thrust bearing assembly according to an exemplary embodiment.
Figure 11:
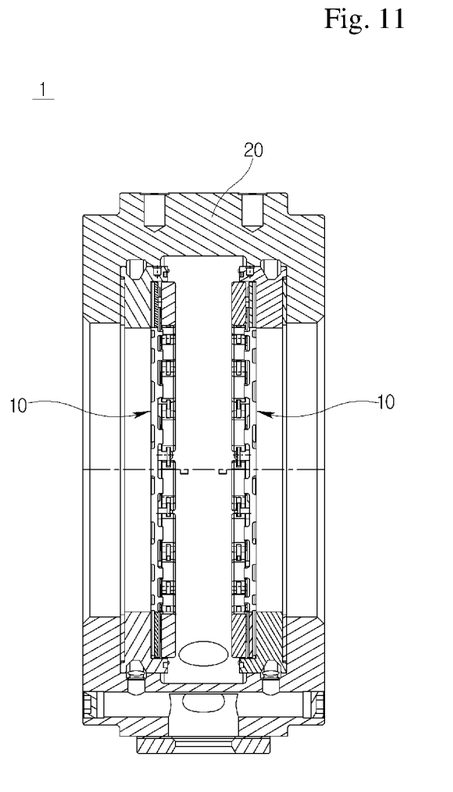
FIG. 11 is a sectional view taken along line 11-11 of FIG. 10.

FIG. 10 is a perspective view illustrating a tilting pad thrust bearing assembly 1 according to an embodiment. FIG. 11 is a sectional view taken along line B-B of FIG. 10.

As shown in FIGS. 10 and 11, the tilting pad thrust bearing assembly 1 according to the present embodiment includes a housing 20.

The housing 20 has a cylindrical structure with a hollow hole which is formed in the longitudinal direction of the rotating shaft (not shown) so that the rotating shaft can be inserted into the housing 20.

A plurality of tilting pad thrust bearings 10 are installed in the housing 20 in such a way that the bearings 10 face each other with respect to the longitudinal direction of the rotating shaft. In detail, the tilting pad thrust bearings 10 are installed to be symmetrical to each other in the housing 20 such that the tilting pads 400 face each other.

As described above, in a tilting pad thrust bearing, when a load is concentrated on only a portion of a thrust bearing because of eccentricity or inclination of a rotating shaft such as a rotor, corresponding tilting pads are tilted so that the load is dispersed to the other tilting pads to which a comparatively small load is applied. Thereby, the tilting pads can be prevented from being damaged. In this way, the durability of the bearing can be enhanced.

Furthermore, the tilting pads can be fixed by oil supply nozzles without using a separate fastening member. Thereby, the size of the tilting pad thrust bearing can be markedly reduced.

Moreover, the tilting pads can be fastened to a plate simultaneously with installation of oil supply nozzles without using a separate fastening member. Therefore, the time and cost required to manufacture the tilting pad thrust bearing or tilting pad thrust bearing assembly can be reduced.

While the present disclosure has been described with respect to the specific embodiments, it will be apparent to those skilled in the art that various changes and modifications may be made without departing from the spirit and scope of the invention as defined in the following claims

What is claimed is:

1. A tilting pad thrust bearing comprising:
    a casing having a disk shape and including a first side protrusion protruding along an outer circumferential edge of a first-side planar surface of the casing, with a first receiving part formed in the planar surface;
    a plate spring having a shape corresponding to a shape of the first receiving part, the plate spring being installed in the first receiving part;
    a plurality of oil supply nozzles inserted into the casing via the plate spring; and
    a plurality of tilting pads installed on a planar surface of the plate spring so as to be tiltable relative to the planar surface of the plate spring,
    wherein the first receiving part comprises:
    a plurality of insert holes formed in a planar surface of the first receiving part and arranged in a circumferential direction of the first receiving part at positions spaced apart from each other, wherein the oil supply nozzles are inserted into the respective insert holes.

2. The tilting pad thrust bearing according to claim 1, wherein:
    shaft holes are respectively formed in the casing and the plate spring so that a rotating shaft is disposed in the shaft holes of the casing and the plate spring; and
    the casing and the plate spring each comprise two semicircular parts coupled to each other to form the disk shape.

3. The tilting pad thrust bearing according to claim 1, wherein the first receiving part comprises:
    a plurality of coupling holes formed in the planar surface of the first receiving part and arranged in the circumferential direction of the first receiving part, wherein fastening means for coupling the plate spring to the first receiving part is inserted into the coupling holes.

4. The tilting pad thrust bearing according to claim 3, wherein:
    a peripheral depression is formed in a circumferential direction in an outer circumferential surface of the casing; and
    a plurality of oil supply holes and a plurality of oil passages are formed in the peripheral depression and arranged in the circumferential direction, wherein the oil supply holes communicate with the respective insert holes, and the oil passages extend inward in a radial direction from the respective oil supply holes to the corresponding insert holes.

5. The tilting pad thrust bearing according to claim 4, wherein the plate spring comprises:
    a plurality of base parts contacting with the planar surface of the first receiving part;
    a plurality of seating parts protruding from the base parts toward the tilting pad; and
    a plurality of bridge parts connecting the base parts and the seating parts.

6. The tilting pad thrust bearing according to claim 5, wherein the plate spring includes a plurality of fixing holes formed at positions corresponding to the respective coupling holes, the fixing holes extending from the bridge parts to the base parts, wherein the fastening means is inserted into the fixing holes.

7. The tilting pad thrust bearing according to claim 6, wherein the plate spring further includes a plurality of through holes formed at positions corresponding to the respective insert holes, the through holes extending from the bridge parts to the base parts, wherein the fastening means is inserted into the through holes.

8. The tilting pad thrust bearing according to claim 7, wherein the plate spring further includes a stop protrusion protruding from a radial-inner edge of each of the seating parts and configured to restrict movement of the corresponding tilting pad.

9. The tilting pad thrust bearing according to claim 8, wherein each of the oil supply nozzles comprises:
    a cylindrical nozzle body inserted at a first end thereof into the corresponding insert hole; and
    a flange provided around an outer circumferential surface of a second end of the nozzle body.

10. The tilting pad thrust bearing according to claim 9, wherein each of the oil supply nozzles further comprises:
    an oil outlet port formed on the flange; and
    a hollow portion formed to pass through the nozzle body in a longitudinal direction of the nozzle body, the hollow portion communicating with the oil outlet port.

11. The tilting pad thrust bearing according to claim 10, wherein the oil outlet port protrudes outward from a planar surface of the flange.

12. The tilting pad thrust bearing according to claim 10, wherein each of the tilting pads comprises:
    a pad body; and
    a groove formed in each of opposite side surfaces of the pad body so that a portion of the corresponding flange is inserted into the groove.

13. The tilting pad thrust bearing according to claim 12, wherein a width of the groove of the tilting pad is greater than a thickness of the flange.

14. A tilting pad thrust bearing assembly including the tilting pad thrust bearing according to claim 1, the tilting pad thrust bearing assembly comprising:
    a cylindrical housing having a hollow hole in a central portion thereof,
    wherein the tilting pad thrust bearing comprises a plurality of tilting pad thrust bearings installed symmetrical to each other in the housing such that the tilting pads of the tilting pad thrust bearings face each other.

15. A tilting pad thrust bearing comprising:
    a casing having a disk shape and including a first side protrusion protruding along an outer circumferential edge of a first-side planar surface of the casing, with a first receiving part formed in the planar surface;

a plate spring having a shape corresponding to a shape of the first receiving part, the plate spring being installed in the first receiving part;

a plurality of oil supply nozzles inserted into the casing via the plate spring; and a plurality of tilting pads installed on a planar surface of the plate spring so as to be tiltable relative to the planar surface of the plate spring, wherein:

shaft holes are respectively formed in the casing and the plate spring so that a rotating shaft is disposed in the shaft holes of the casing and the plate spring; and the casing and the plate spring each comprise two semicircular parts coupled to each other to form the disk shape, wherein the casing comprises:

a second-side protrusion protruding along an outer circumferential edge of a planar surface facing away from the planar surface on which the first side protrusion is provided; and a second receiving part provided on the planar surface on which the second side protrusion is provided.

16. The tilting pad thrust bearing according to claim 15, further comprising:

a shim plate installed in the second receiving part, the shim plate having a shape corresponding to the second receiving part.

17. The tilting pad thrust bearing according to claim 16, wherein the shim plate comprises two semicircular divided parts coupled to each other to have a disk shape.

18. The tilting pad thrust bearing according to claim 17, wherein a plurality of pin holes are formed in the shim plate and pins are inserted into the respective pin holes.

19. The tilting pad thrust bearing according to claim 18, further comprising:

a plurality of thermocouple guide units, each comprising:
   a support installed in the first side protrusion; and
   a guide inserted through the support.

20. The tilting pad thrust bearing according to claim 19, wherein the guide is configured such that a front end thereof protrudes from the first side protrusion.

\* \* \* \* \*